United States Patent [19]
Portalier

[11] 3,931,765
[45] Jan. 13, 1976

[54] SOLID PROPELLANT DESIGNED TO BURN CENTRIPETALLY AND ITS USE IN ROCKET ENGINES OR OTHER MOTORS

[75] Inventor: Pierre Louis Portalier, Sevres, France

[73] Assignee: Societe Nationale des Poudres et Explosifs, France

[22] Filed: Sept. 7, 1973

[21] Appl. No.: 395,059

[30] Foreign Application Priority Data
Sept. 26, 1972 France .............................. 72.33943

[52] U.S. Cl. ..................................... 102/99; 60/255
[51] Int. Cl.² ........................................... F42B 1/00
[58] Field of Search ............. 102/99, 100, 101, 102, 102/103, 104, 105

[56] References Cited
UNITED STATES PATENTS
3,256,819  6/1966  Leeper................................ 102/100

OTHER PUBLICATIONS
"Jet Propulsion" Magazine; April 1958; A Practical Mathmatical Approach to Grain Design; Max W. Stone; pp. 236–244.

*Primary Examiner*—Samuel Feinberg
*Attorney, Agent, or Firm*—Bucknam and Archer

[57] ABSTRACT

A solid cylindrical centripetally burning propellant element having an instantaneous combustion surface of substantially constant magnitude exhibits rotational symmetry of order $n$ ($2 \leq n \leq 15$) about a longitudinal axis. The cross-section of the element presents $n$ convolute branches, each terminating in a semicircular arc of radius equal to the combustion thickness $e$, the cross-section being the envelope generated by a circle of radius $e$ which rolls on a n-symmetrical base-line comprising a polygon having $n$ concave sides forming $n$ similar cusps extended by respective curved arms. The contour of the polygon generatrix defines the outer limit of the single combustion residue of the element, by which the element may be secured in the combustion chamber of a rocket engine.

7 Claims, 7 Drawing Figures

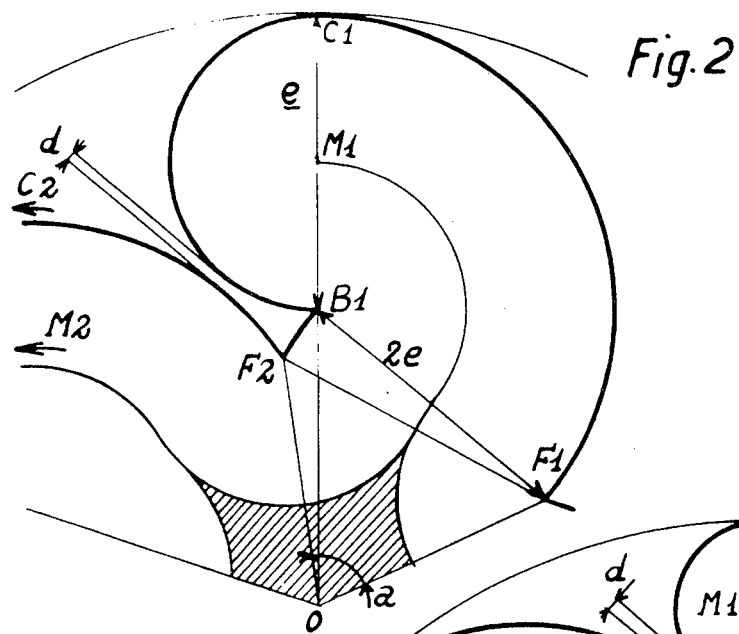
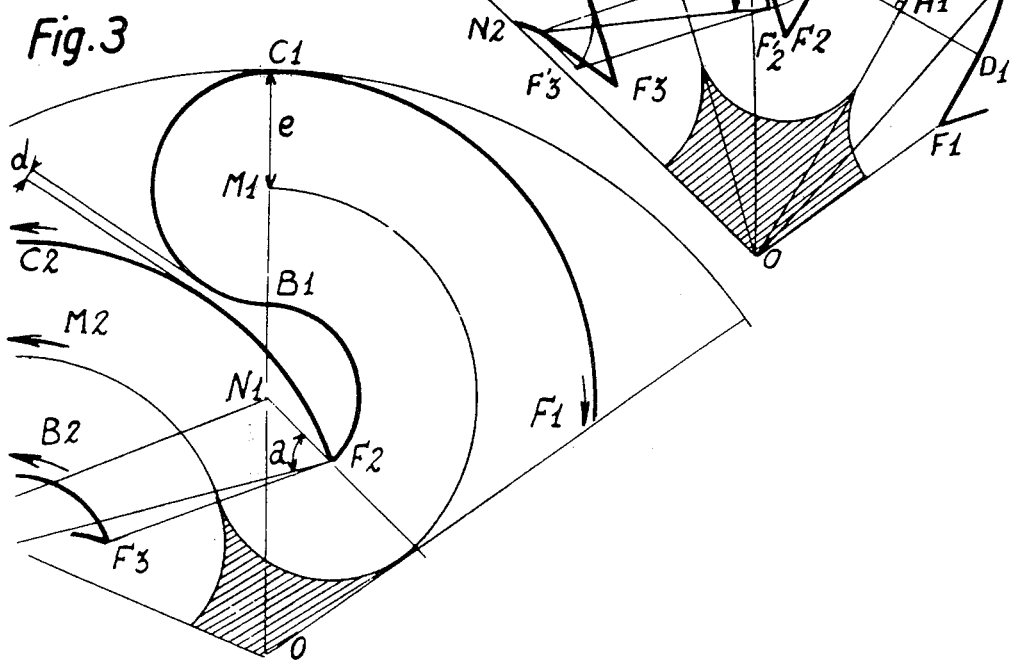

SOLID PROPELLANT DESIGNED TO BURN CENTRIPETALLY AND ITS USE IN ROCKET ENGINES OR OTHER MOTORS

The present invention relates to a solid propellant element which is designed to burn from the outside or centripetally and to the use of such an element in a rocket engine or other motor. The element is particularly useful in a light or medium rocket.

It is generally desirable that a propellant element should produce the most constant possible thrust while firing. This condition would be realised ideally if the surface area of combustion of a solid propellant element were arranged to remain substantially constant during combustion.

It is possible to arrange for the combustion surface to include both convex and concave portions. During combustion the areas of the convex portions decrease, while the areas of the concave portions increase. In practice satisfactory (although incomplete) compensation of the overall decrease in combustion area can be achieved in this way. However, the design of such an element may be complicated by various considerations. For Example:

- the number of combustion residues left (the result of fragmentation of the element at a certain stage of the combustion) should not be high.
- the ratio of the volume of these residues to the initial total volume of the element should not be high, since this represents a waste of propellant,
- it would be desirable to be able to change continuously during design the relative combustion thickness $e/R$ ($e$ being the combustion thickness of the element before extinction of any part of the combustion surface leaves the combustion residues and $R$ being the radius of the cylinder circumscribing the element) rather than changing it discontinuously by changing the number of lobes,
- it would be desirable to be able to design elements of low relative combustion thicknesses $e/R$ without increasing the number of lobes, which would simultaneously increase the fragility of the elements and the size and number of residues, and a large filling coefficient (ratio of the volume of the element to the volume of the circumscribing cylinder) is desirable.

One aspect of the present invention provides a solid cylindrical propellant element for centripetal combustion, the cross-section of the combustion surface of the element exhibiting rotational symmetry of order $n$ about a longitudinal axis of the element, where $n$ is an integer greater than or equal to 2, the element presenting $n$ similar convolute limbs extending from a common centre and terminating in respective semicircular arcs of radius $e$ where $e$ is the combustion thickness of the element, one end of each of said semicircular arcs being tangential to a right circular cylinder circumscribing the element, and the element having a single combustion residue disposed centrally in the element.

Preferably, the thickness of combustion $e$ of the block is substantially such that: $R/10 < e < 2R/3$ and preferentially $0.2R < e < 0.4R$.

The shape of the blocks is, in fact, equally compatible with thicknesses of combustion as low as $R/10$ and with thicknesses as high as $2R/3$.

In use, the solid propellant element is preferably fixed against the front of the combustion chamber in a propulsion device by means of an anchoring rod, which penetrates into the location of the combustion residue in the element so that the useful volume of propellant is not limited by the means of the attachment.

Preferably, an arc of a circle of radius greater than or equal to $2e$ extends the semi-circle of radius $e$ and is tangential simultaneously to the cylinder of radius $R$ and to the semi-circle of radius $e$.

Another aspect of the invention provides a solid cylindrical propellant element for centripetal combustion, the cross-section of the combustion surface of the element exhibiting rotational symmetry of order $n$ about a longitudinal axis of the element, where $n$ is an integer greater than or equal to 2, the cross-section being in the shape of an envelope generated by a circle of radius $e$ (where $e$ is the combustion thickness of the element) whose centre describes a generatrix also having rotational symmetry of order $n$ about said axis, said generatrix comprising $n$ cusps each of which is extended by a respective curved arm, so that said element has a single combustion residue in the shape of said generatrix.

Preferably, the combustion thickness $e$ of the element is such that
$$0.05R \leq e \leq 0.31R$$

The shape of the blocks is, in fact compatible with combustion thickness as low as $0.05R$ and with thicknesses as high as $R/3$. Moreover, the shape of the blocks makes it possible to obtain low thicknesses of combustion, without increasing the number $n$ of branches too much, which would considerably complicate their manufacture or even make it impossible. An element having a ratio of $e/R$ equal to 0.31 can satisfactorily be obtained with three branches.

Embodiments of the invention will now be described by way of example with reference to the accompanying drawings in which:

FIGS. 2 to 4 are diagrammatic views in partial transverse cross-section of other solid propellant elements in accordance with the invention.

Figure 1:
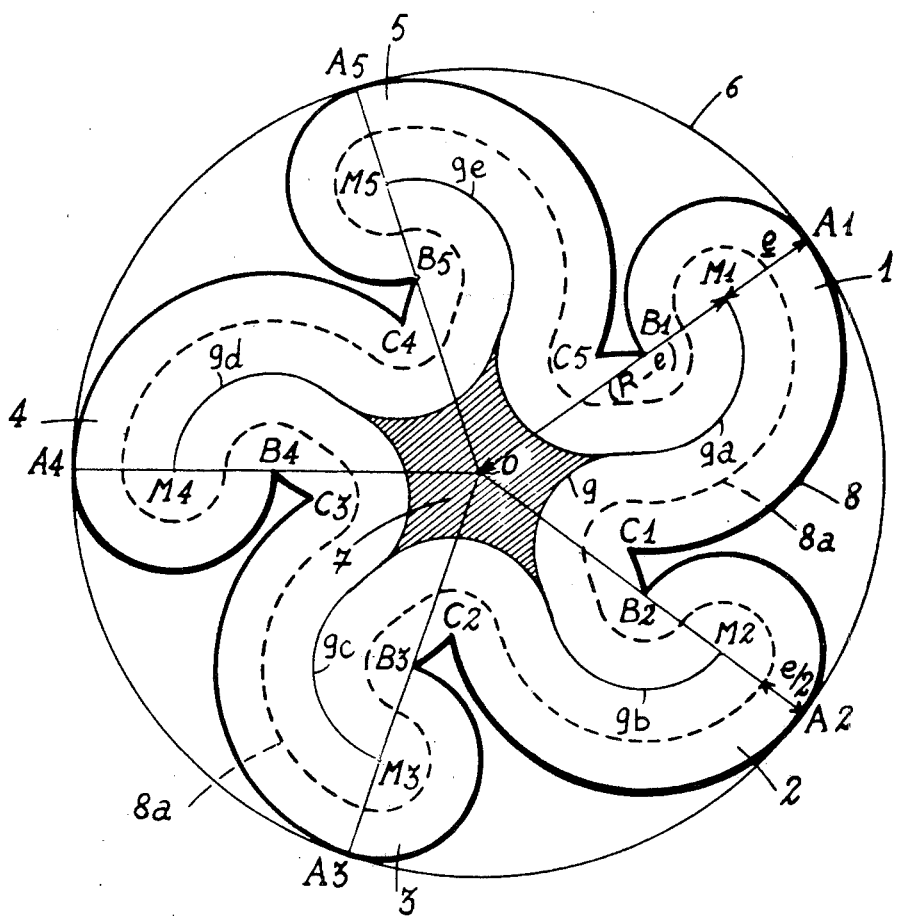
FIG. 1 is a diagrammatic view in transverse cross-section of a solid propellant element in accordance with the invention.

The solid propellant elements shown in the drawings are centripetally burning cylindrical elements of convoluted combustion surfaces, which are illustrated by their uniform cross-sections in FIGS. 1 to 4 of the drawings.

In the element illustrated in FIG. 1, the transverse cross-section of the combustion surface is a surface possessing five branches 1, 2, 3, 4 and 5, the axis which is perpendicular to the plane of the figure and which passes through O being an axis of symmetry of order 5.

The part of the branches 1, 2, 3, 4 and 5 farthest from 0 is curved along an arched contour comprising a semi-circle $A_1B_1$, $A_2B_2$, ... or $A_5B_5$, the end $A_1$, $A_2$ or $A_5$ of which corresponds to the point of tangential contact of the semi-circle with the circumscribing circle 6 of radius $R$. The semi-circle $A_1B_1$, $A_2B_2$ or $A_5B_5$ has a radius $e$ equal to the thickness of combustion of the block.

The above mentioned semi-circle are connected to one another by arcs $A_1C_1$, $A_2C_2$ ... or $A_5C_5$ simultaneously tangential to the semi-circles and to the circumscribing circle 6 and centred respectively at $B_1$, $B_2$ ... or $B_5$ and by arcs $C_1B_2$, $C_2B_3$ ... or $C_5B_1$ centred respectively at $C_2$, $C_3$ ... or $C_1$.

The position of the single combustion residue 7 has also been denoted in this figure by a central cross-hatched area, the external contour of the latter being situated at a distance $e$ from the external contour of each branch.

It can also be seen in this FIG. 1 that the external contour 8 of the solid propellant element is the envelope generated by a circle of radius $e$, the centre of which describes a generatrix comprising closed curve also having rotational symmetry of order $n$, equal to 5 in the case of the figure, and consisting of the external contour 9 of the residue 7. The above mentioned closed curve also comprises curved arms $9a$, $9b$ ... or $9e$ which extend each cusp of the residue 7 and project as far as the points $M_1$, $M_2$ ... or $M_5$ situated at a distance $(R-e)$ from O.

In the embodiment represented in FIG. 1, each arm consists essentially of a doube arc with centres $B_1$, $B_2$ ... $B_5$ connected by double straight lines to the cusps of the residual 7.

The propellant element functions as follows after igniting the external surface 8 of the propellant element the combustion surface (or flame front) travels towards the inside of the element. This combustion surface always remains parallel to the external surface 8 which is the original combustion surface until the entire combustion thickness $e$ is consumed, as is shown, for example, by the combustion surface $8a$ produced when the thickness $e/2$ has been consumed.

The change in the surface area of combustion 8 is a progressively decreasing linear function of the thickness of propellant consumed.

When the entire combustion thickness $e$ has been consumed, the combustion surface produced is identical to the external surface 9 of the residual. Beyond this limit, part of the combustion surface is extinguished and the area of combustion decreases very rapidly as the combustion residue burns.

Various examples of solid propellant elements will now be described in more detail.

For simplicity, only the transverse cross-section of one branch of each element will be described; the others can be deduced therefrom by a rotation of $2\pi/n$ about the axis of the block, n being the order of symmetry of this axis.

In all these examples, the external contour of the branch $F_1F_2$ comprises a semi-circle $C_1B_1$ of radius $e$, tangential at $C_1$ to the circumscribing circle of radius R. One of the ends of this semi-circle is extended by an arc of a circle which is tangential to it, and then, in certain cases, by a segment of a tangential straight line, the other end being extended by another tangential arc or by an arc and a segment of a straight line tangential to the arc, depending on the relative thickness of combustion $(e/R)$ desired.

EXAMPLE I (see FIG. 2)

In this embodiment, the external contour of the branch $F_1F_2$ consists of a semi-circle $C_1B_1$ of radius $e$ and centre $M_1$ tangential at $C_1$ to the circumscribing circle of radius R and centre 0. The end $C_1$ of the semi-circle $C_1B_1$ is extended by an arc of a circle $C_1F_1$ of radius $2e$ and centre $B_1$.

The end $B_1$ of the semi-circle $C_1B_1$ is extended by an arc of a circle $B_1F_2$ of radius $2e$ and centre $F_1$, the point $F_1$ being the intersection of the arc of a circle $C_1F_1$ with the homologous arc of a circle $B_1F_2$ (not shown) of the adjacent branch.

The angle $a$ between $OF_1$ and $OF_2$ is equal to $2\pi/n$, n being equal to the number of branches of the block.

This embodiment, which is particularly simple, is suitable for relatively high thicknesses of combustion, substantially such that:
$$0.23\ R \leq e \leq 0.31\ R,$$
the number $n$ of branches being between 2 and 5.

The ratio of initial to final combustion areas in this embodiment is quite close to unity, and the element has a high filling factor and a low combustion residue volume.

The distance d between the arc $C_1B_1$ and the arc $F_2C_2$ (homologue of $F_1C_1$) is preferably such that:
$$0.03R < d < 0.06R$$
the lower limit $0.03\ R$ being fixed by the feasibility of manufacturing the block and the upper limit $0.06\ R$ being imposed in order to have a suitable filling factor.

If, by graphical construction of a block having a given value of e/R and a number of branches $n$, it is found that the distance $d$ would be less than the chosen lower limit, it is necessary to repeat the graphical construction with a number of branches $(n+1)$. If, on graphical construction, $d$ is higher than the chosen upper limit, it is useful to repeat the graphical construction with a number of branches $(n-1)$ or to produce the block in accordance with examples II and III below.

EXAMPLE II (see FIG. 3)

In this embodiment, the external contour of the branch $F_1F_2$ consists of a semi-circle $C_1B_1$ of radius $e$ and centre $M_1$, tangential at $C_1$ to the circumscribing circle of radius R and centre O. The end $C_1$ of the semi-circle $C_1B_1$ is extended by an arc of a circle $C_1F_1$ having its centre at $N_1$ situated on the segment $B_1O$ and having as its radius the maximum permissible value with the distance $d$ chosen in accordance with the criteria described above. The end $B_1$ of the semi-circle $C_1B_1$ is extended by an arc of a circle $B_1F_2$ tangential at $B_1$ to the semi-circle $C_1B_1$ and having its centre at $N_1$.

The angle $a$ between $N_1F_2$ and $F_2N_2$, $N_2$ being the homologue of $N_1$, is less than $2\pi/n$, n being equal to the number of branches.

This embodiment is suitable for thicknesses of combustion $e$ less than those of the preceding example and substantially such that:
$$0.15\ R \leq e \leq 0.23R$$
it being possible for the number $n$ of branches to be between 5 and 8.

This element also has a ratio of initial to final combustion areas close to unity, a good filling factor and a low combustion residue $e$ volume although the latter is greater than that obtained according to the preceding example.

EXAMPLE III (see FIG. 4)

In this embodiment, the external contour of the branch $F_1F_2$ consists of a semi-circle $C_1B_1$ of radius $e$ and centre $M_1$ tangential at $C_1$ to the circle of radius R and centre O. The end $C_1$ of the semi-circle $C_1B_1$ is extended by an arc of a circle $C_1D_1$ having its centre at $N_1$ situated on the segment $B_1O$ and having as its radius the maximum permissible value with the distance $d$ chosen in accordance with the criteria described above. The end $B_1$ of the semi-circle $C_1B_1$ is extended by an arc of a circle $B_1A_1$ tangential at $B_1$ to the semi-circle $C_1B_1$ and having its centre at $N_1$. The arc of a circle $B_1A_1$ is extended by a segment $A_1F_2$ tangential at $A_1$ to the arcs $B_1A_1$ and parallel to the segment $OH_1$ which is tangential at $H_1$ to the arc $M_1H_1$ equidistant from the arcs $B_1A_1$ and $C_1D_1$. The arcs of a circle $C_1D_1$ is extended by a segment $D_1F_1$ tangential at $D_1$ to the arc $C_1D_1$ and parallel to the segment $OH_1$, $F'_2$ being respectively the intersections of the extension of the arcs $B_1A_1$ and $C_2D_2$ and of the arcs $B_2A_2$ and $C_3D_3$, and $F'_2$ being respectively the intersections of the extension of the arcs $B_1A_1$ and $C_2D_2$ and of the arcs $B_2A_2$ and $C_3D_3$, and $F'_3$ being the homologue of $F'_2$ for the adjacent branch $F_2F_3$; the angle $a$ between $N_1F'_2$ and $F'_2N_2$ is greater than $2\pi/n$, $n$ being equal to the number of branches.

This embodiment is suitable for very low thicknesses of combustion $e$, substantially such that:

$$0.05\,R \leq e \leq 0.15\,R$$

the number $n$ of branches being preferably between 7 and 15.

Figure 5:
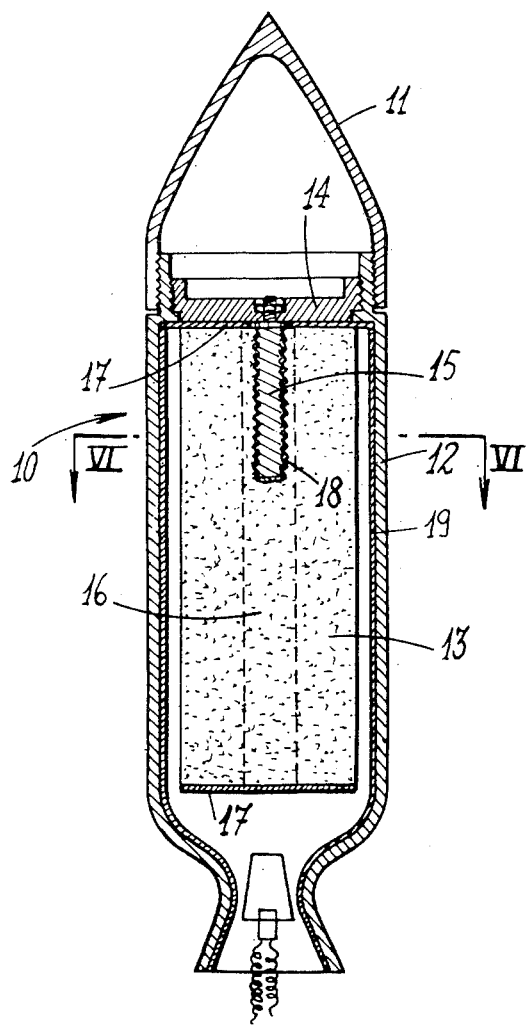
FIG. 5 is a view in longitudinal cross-section of a propulsion device in accordance with the invention.

The external contours of the embodiments described in Examples I to III can also be characterised according to the variant indicated with reference to FIG. 5.

For example, the external contour $F_1F_2$ of the embodiment represented in FIG. 4 can be characterised by the envelope described by a circle of radius $e$, the centre of which describes the contour of the residuel (cross-hatched area), the cusps of which are extended by double straight line segments and by double arcs of a circle having $M_1$ as the end and $N_1$ as the centre.

The elements described above have a surface area of combustion which is adequately constant, a good filling factor and a combustion residue which is usually less than 10% which is acceptable; moreover, the proportion of wasted propellant can be further reduced by a corresponding amount by an attachment rod of sufficient external diameter projecting into the combustion residue.

The relative combustion thicknesses can vary continuously between very wide limits, by changing the geometry of the branches and optionally by changing their number.

For example, for thicknesses of combustion as low as $0.10\,R$ the number of branches is equal to 11, which is not very high, and consequently does not present any difficulty in production.

The following table gives some combustion characteristics of the solid propellant elements according to the above mentioned examples.

In this table, $k$ denotes the ratio of the initial combustion perimeter Po (perimeter of the transvers cross-section of the block) to the perimeter of the cross-section of the circumscribing cylinder of radius R.

Pf denotes the final combustion perimeter of the block, when the thickness $e$ has been consumed.

Pm denotes the combustion perimeter when the thickness $e/2$ has been consumed.

It can be shown that:

Po/Pf is equal to $k/(k - e/R)$ and

Po/Pm is equal to $k/(k - e/2R)$ $p\%$ denotes the effective filling factor of the block: it is equal to 100 times the ratio of the volume of the block less the volume of the combustion residue to the volume of the circumscribing cylinder.

$p$ is also equal to $100\,(2\,k\,e/R - e^2/R^2)\%$.

| Number of example | I | II | I | II | I | II | II | II | III | III | III | III | III |
|---|---|---|---|---|---|---|---|---|---|---|---|---|---|
| e/R | 0.31 | 0.275 | | 0.25 | | 0.21 | 0.20 | | | 0.15 | | 0.10 | |
| n | 3 | 3 | 4 | 4 | 5 | 5 | 5 | 6 | 6 | 7 | 8 | 10 | 11 |
| k | 1.26 | 1.35 | 1.42 | 1.56 | 1.59 | 1.85 | 1.9 | 1.85 | 1.9 | 2.35 | 2.40 | 3.2 | 3.28 |
| Po/Pf | 1.327 | 1.24 | 1.24 | 1.18 | 1.18 | 1.13 | 1.12 | 1.12 | 1.12 | 1.07 | 1.07 | 1.03 | 1.03 |
| Po/Pm | 1.14 | 1.10 | 1.10 | 1.08 | 1.08 | 1.06 | 1.06 | 1.06 | 1.06 | 1.03 | 1.03 | 1.02 | 1.02 |
| p % of residual | 68.9 | 66.7 | 70.5 | 71.7 | 73.5 | 73.3 | 72 | 70 | 72 | 68.2 | 69.7 | 63 | 64.6 |
| number | 0.7 | 2.8 | 3.2 | 2.5 | 5.5 | 4 | 3.5 | 9.8 | 6.7 | 6.6 | 9.1 | 9.2 | 10.3 |
| of residuals | 1 | 1 | 1 | 1 | 1 | 1 | 1 | 1 | 1 | 1 | 1 | 1 | 1 |

It will be seen that the ratios Po/Pf and Po/Pm are very close to 1. The values indicated for $p$ show that, in every case, the filling coefficient is suitable, being greater than 63%. Moreover, the proportions of residue remains very low for relative combustion thicknesses between 0.31 and 0.20 and is less than or equal to 10% for low thicknesses of combustion between 0.20 and 0.10.

The elements shown in the drawings can be manufactured without difficulty by suitable processes of moulding and extrusion from suitable compositions of propellants moulding being used in the case of thick blocks and extrusion in the case of thin blocks.

Figure 7:
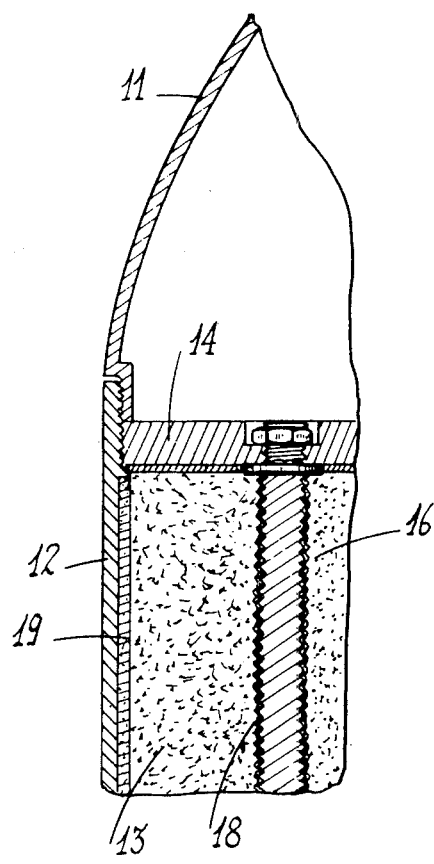
FIG. 7 is a view in partial longitudinal cross-section of another propulsion device in accordance with the invention.
Figure 6:
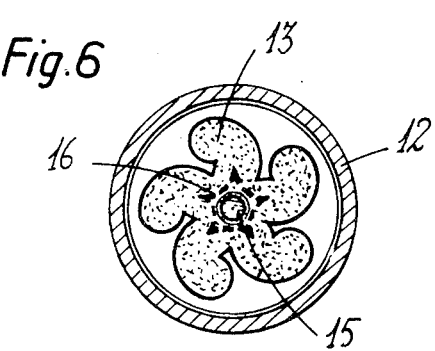
FIG. 6 is a sectional view along the line VI—VI of FIG. 5.

The motor 10 shown in FIGS. 5 to 7 of the attached drawings comprises a head 11 and a body 12 inside which a solid propellant element 13 in accordance with the invention is located.

The body 12 of the propulsion device comprises a front base 14 which separates it from the head. The element 13 is fixed to the front base 14 of the body 12 of the propulsion device by means of an anchoring rod 15 which penetrates into the central combustion residue 16 (represented by broken lines).

This arrangement makes it possible firmly to fix the block of propulsive fuel 13 inside the body 12 of the propulsion device, without in any way decreasing the useful volume of propellant in the element.

In order that combustion takes place perpendicularly to the axis of the element, the bases of the latter are optionally coated with a combustion inhibitor 17.

Moreover, it is preferable for the anchoring rod itself to be insulated from the propulsive fuel by an inhibiting coating 18.

Certain applications require that the propellant element be wedged inside the body 12 of the propulsion device. This wedging can be achieved by means of a refractory coating 19 which adheres to the body and is in contact with the block 13.

Various modifications to the elements described will occur to those skilled in the art. For example the transverse cross-section of the blocks can be changed. The arcs $C_1B_1$, $C_1F_1$, $B_1F_2$ or $C_1D_1$ or $B_1A_1$ can be arcs of other than arcs of a circle, but preferably approaching the latter rather closely and having a mean radius of curvature equal to that indicated or described in the above mentioned description.

I claim:

1. A solid cylindrical externally burning propellant element adapted to be fixed in a propulsion device, having substantially constant burning surface, said element having a cross section such that it may be inscribed in a cylinder of radius R, and longitudinal axis O, the cross section of said element exhibiting rotational symmetry of order $n$ about said longitudinal axis of the element, wherein $n$ is an integer number greater than or equal to 2, the cross section of the element having a contour consisting of identical and convoluted lobes, wherein $n$ is as defined hereinabove, each of said lobes being connected to its adjacent lobes, the portions of the lobes which are the farthest from the axis O of said cylinder of radius R being curved and consisting of semicircular arcs of radius $e$, wherein $e$ is the combustion thickness of the element, each of said semicircular arcs being tangential to said cylinder of radius R at a point which coincides with one end of the said semi-circular arcs, each of said semicircular arcs being extended by a convex arc of a circle of radius at least equal to $2e$, each of said convex arcs being tangential to said cylinder of radius R, at the same point at which each of said semicircular arcs is tangential to said cylinder of radius R, said propellant element giving a single residue of polygonal shape, on combustion, said element being anchored in said propulsion device through attachment means set in the location of said residue, the external contour of said residue being situated at a distance $e$ from the external contour of each lobe, $e$ being as defined hereinabove.

2. A propellant element as claimed in claim 1 wherein the combustion thickness $e$ of the element is such that $0.05R \leq e \leq 0.3 R$.

3. A propellant element as claimed in claim 1 wherein, each lobe has two adjacent lobes, said semicircular arc of each lobe is spaced from each adjacent lobe by a distance $d$ such that $0.03R \leq d \leq 0.06R$, $d$ being the minimum distance between each semicircular arc and the convex arc of the adjacent lobe.

4. A solid cylindrical propellant element as claimed in claim 1 wherein $n$ is less than 16.

5. A propellant element according to claim 1 wherein the combustion thickness $e$ is such that $0.23 R \leq e \leq 0.31 R$ and each of said semicircular arcs of radius $e$ has center $M_1$ and has one end $C_1$ extended by each of said convex arcs $C_1F_1$ of radius $2e$ and center $B_1$, $B_1$ being the other end of said semicircular arc, said semicircular arcs being extended from said end $B_1$ by an arc of a circle $B_1F_2$ of said radius $2e$ and center $F_1$, $F_1$ being the intersection of said arc $C_1F_1$ of a circle with the homologous arc of a circle of the adjacent lobe.

6. A propellant element according to claim 1 wherein the combustion thickness $e$ is $0.15 R \leq e \leq 0.23R$, each lobe $F_1F_2$ consists of a semicircular arc $C_1B_1$ of center $M_1$, one end $C_1$ which is tangential to said circle of radius R extends in first arc $C_1F_1$ having its center at $N_1$, which is situated on the segment $B_1O$, 0 being the axis of the cylinder, the other end of said semicircular arc $B_1$ is extended by a second arc $B_1F_2$ which is tangential at $B_1$ to said semicircle $B_1C_1$, said arc $B_1F_2$ having center at $N_1$.

7. A propellant element according to claim 6, wherein the combustion thickness e is at the most equal to $0.15 R$, said first arc $C_1D_1$ and second arc $B_1A_1$ are respectively extended in respective straight line portions parallel to the segment $OH_1$ intersecting said axis O, said segment $OH_1$ is tangential at $H_1$ to the arc $M_1H_1$ equidistant from the arcs $B_1A_1$ and $C_1D_1$.

* * * * *